(12) United States Patent
Zhou et al.

(10) Patent No.: US 11,835,831 B2
(45) Date of Patent: Dec. 5, 2023

(54) INFRARED REFLECTION DEVICE WITH ADJUSTABLE REFLECTION PROPORTION

(71) Applicants: South China Normal University, Guangzhou (CN); Shenzhen Guohua Optoelectronics Co., Ltd., Shenzhen (CN); Academy of Shenzhen Guohua Optoelectronics, Shenzhen (CN)

(72) Inventors: Guofu Zhou, Guangdong (CN); Xiaowen Hu, Guangdong (CN); Nan Li, Shenzhen (CN)

(73) Assignees: SOUTH CHINA NORMAL UNIVERSITY, Guangzhou (CN); SHENZHEN GUOHUA OPTOELECTRONICS CO., LTD., Shenzhen (CN); ACADEMY OF SHENZHEN GUOHUA OPTOELECTRONICS, Shenzhen (CN)

( * ) Notice: Subject to any disclaimer, the term of this patent is extended or adjusted under 35 U.S.C. 154(b) by 393 days.

(21) Appl. No.: 16/486,225

(22) PCT Filed: Nov. 15, 2017

(86) PCT No.: PCT/CN2017/110972
§ 371 (c)(1),
(2) Date: Aug. 15, 2019

(87) PCT Pub. No.: WO2018/227870
PCT Pub. Date: Dec. 20, 2018

(65) Prior Publication Data
US 2020/0057322 A1 Feb. 20, 2020

(30) Foreign Application Priority Data
Jun. 15, 2017 (CN) .................. 201710451872.3

(51) Int. Cl.
*G02F 1/137* (2006.01)
*E06B 9/24* (2006.01)
(Continued)

(52) U.S. Cl.
CPC ................ *G02F 1/137* (2013.01); *E06B 9/24* (2013.01); *G02F 1/1334* (2013.01);
(Continued)

(58) Field of Classification Search
None
See application file for complete search history.

(56) References Cited

U.S. PATENT DOCUMENTS
2016/0026026 A1  1/2016  Kim et al.

FOREIGN PATENT DOCUMENTS
CN   102722053   10/2012
CN   104330931   2/2015
(Continued)

OTHER PUBLICATIONS

International Search Report for PCT/CN2017/110972 dated Mar. 27, 2018.

*Primary Examiner* — Lauren Nguyen
(74) *Attorney, Agent, or Firm* — Gottlieb, Rackman & Reisman, P.C.

(57) ABSTRACT

An infrared reflection device includes a power supply assembly, a plurality of switches, and two relatively disposed light-transmitting conductive substrates packaging a regulating area. Each of the light-transmitting conductive substrates comprise a light-transmitting substrate and an electrode layer. The regulating area is filled with a liquid crystal mixture; the electrode layers are arranged on opposite surfaces of the two light-transmitting substrates; the electrode layer of at least one of the light-transmitting conductive substrates comprises at least two mutually inde-
(Continued)

pendent electrode areas; and electrode areas of the same light-transmitting conductive substrate, after being respectively connected in series to the switches, are jointly connected in parallel to the same electrode of the power supply assembly.

10 Claims, 1 Drawing Sheet

(51) Int. Cl.
    *G02F 1/1334* (2006.01)
    *G02F 1/1337* (2006.01)
    *G02F 1/1343* (2006.01)

(52) U.S. Cl.
    CPC ........ *G02F 1/1337* (2013.01); *G02F 1/13439* (2013.01); *G02F 1/134309* (2013.01); *E06B 2009/2464* (2013.01); *G02F 1/13345* (2021.01); *G02F 1/13712* (2021.01); *G02F 2203/11* (2013.01)

(56) References Cited

FOREIGN PATENT DOCUMENTS

| | | | | |
|---|---|---|---|---|
| CN | 104614888 | | 5/2015 | |
| CN | 105301850 | | 2/2016 | |
| CN | 106646985 | | 5/2017 | |
| CN | 106646985 A | * | 5/2017 | ......... G02F 1/13718 |
| CN | 107272277 | | 10/2017 | |
| JP | 2006124189 | | 5/2006 | |
| KR | 101705023 B1 | * | 2/2017 | ............... E06B 9/28 |
| WO | 2013082380 | | 6/2013 | |

* cited by examiner ial Stage application of
INFRARED REFLECTION DEVICE WITH ADJUSTABLE REFLECTION PROPORTION This application is the U.S. National Stage application of PCT/CN2017/110971 filed Nov. 15, 2017 which claims priority to CN application 201710451872.3 filed Jun. 15, 2017

FIELD

The present disclosure relates to the fields of articles for building, furniture and living, and in particular, to an infrared reflection device with an adjustable reflection proportion.

BACKGROUND

People have always been pursuing the comfort of the internal environment of a building, while temperature is one of the important factor influencing the comfort. Thus, people use various temperature adjusting devices such as air conditioners to adjust the temperature inside a building, however, with the use of these devices, a lot of energy is consumed, causing a great negative impact on the environment.

Therefore, various materials of outer building were put into use and played an important role, and meanwhile, many innovative technologies emerged, and the opaque thermal insulation material and technology used for building facades have matured relatively. However, infrared rays from sunlight still can enter a building through devices such as windows and glass curtain walls, significantly influencing the temperature inside a building, therefore, people start to focus on infrared reflection technologies and materials used for windows.

The traditional shading devices such as curtains and louvers have a great influence on transmission of visible light. As other light sources are needed inside a building, it is not conducive to energy conservation and emission reduction, and moreover, the reflection effect of infrared rays is not so good. Inorganic film coating material both has a high transmission ratio of visible light and a high reflection ratio of infrared rays, but the reflection of infrared rays is not adjustable, the infrared rays from sunlight are still be reflected when the temperature is lower. As a result, the workload of temperature regulation equipment is increased, and it is not conducive to energy conservation.

Infrared reflection sheet can transmit and reflect infrared rays without influencing the transmission of visible light. Through adjusting a voltage, the infrared reflection sheet can transmit infrared rays at a low temperature and can reflect some of infrared rays from sunlight at a high temperature, thereby reaching the purpose of adjusting the temperature inside a building. In this way, to some extent, it can replace the function of indoor temperature adjusting devices such as air conditioners, thus, it has a good application aspect in the fields such as glass of vehicle windows, home windows and glass window walls.

However, the reflection proportions of the current infrared reflection sheets are not adjustable, only on/off operations can be realized.

SUMMARY

The present disclosure aims at providing an infrared reflection device with an adjustable reflection proportion to solve the technical problem existing in the above prior arts.

The present disclosure adopts the following technical solution.

An infrared reflection device includes two relatively disposed light-transmitting conductive substrates, and further includes a power supply assembly and a plurality of switches, wherein a regulating area is formed by packaging the two light-transmitting conductive substrates. The regulating area is filled with a liquid crystal mixture including a negative liquid crystal and a chiral dopant. Each of the light-transmitting conductive substrates includes a light-transmitting substrate and an electrode layer. The electrode layers are arranged on opposite surfaces of the two light-transmitting substrates. The electrode layer of at least one of the light-transmitting conductive substrates includes at least two mutually independent electrode areas. Corresponding electrode areas of the same light-transmitting conductive substrate, after being respectively connected in series to the switches, are jointly connected in parallel to the same electrode of the power supply assembly.

In some preferred embodiments, the electrode layers of the two light-transmitting conductive substrates both include at least two mutually independent electrode areas.

In some preferred embodiments, the electrode areas are of a strip shape.

In a preferred embodiment of the above solution, the opposite surfaces of the two light-transmitting conductive substrates are further provided with parallel alignment layers.

In a further preferred embodiment of the above solution, the liquid crystal mixture further includes a photoinitiator and a liquid crystal monomer, and the liquid crystal monomer can form a polymer network under ultraviolet irradiation.

In a further preferred embodiment of the above solution, the liquid crystal monomer is a chiral monomer.

In a further preferred embodiment of the above solution, the liquid crystal monomer and/or the chiral dopant can capture impurity cations in the liquid crystal mixture so that the liquid crystal monomer and/or the chiral dopant carries positive charges.

In a further preferred embodiment of the above solution, the liquid crystal monomer and/or the chiral dopant is provided with an ester group capable of capturing cations.

The present disclosure has the beneficial effects as follows.

The present disclosure provides the infrared reflection device with an adjustable reflection proportion, which is formed by packaging two light-transmitting conductive substrates; the regulating area is formed between the two light-transmitting conductive substrates; the regulating area is filled with the liquid crystal mixture; by preparing the electrode layer of at least one of the two light-transmitting conductive substrates into the electrode layer composed of at least two mutually independent electrode areas, various electrode areas of the same light-transmitting conductive substrate, after being respectively connected in series to a switch, are jointly connected in parallel to the same electrode of a power supply assembly; and by controlling the on and off of the switch, the liquid crystal mixture in some part of the areas is controlled to be in the electric field, and the liquid crystal mixture in some part of the areas is controlled to be not in the electric field, so that reflection proportions of reflected infrared rays in corresponding areas of different electrode areas are different. The reflection proportions of the infrared rays can be adjusted according to actual requirements, so that a proper amount of infrared rays are transmitted into a building. It is beneficial for regulating and controlling an internal temperature of the building, reducing the dependence on a temperature regulating device such as an air conditioner, and conducive to energy conservation and ecological environment protection. Thus, it has a good application aspect in the fields such as building facades and glass of vehicle.

BRIEF DESCRIPTION OF THE DRAWINGS

FIG. 2 is a local sectional diagram of an infrared reflection device when all switches are turned on.

DETAILED DESCRIPTION

Embodiment 1

Figure 1:
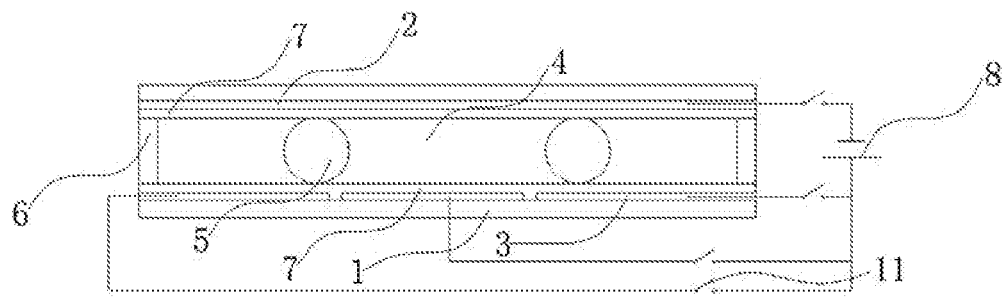
FIG. 1 is a sectional diagram of an infrared reflection device.

FIG. 1 is a sectional diagram of an infrared reflection device. The present disclosure provides an infrared reflection device including oppositely arranged first light-transmitting conductive substrate and a second light-transmitting conductive substrate, and a power supply assembly 8. A regulating area 4 is formed between the two light-transmitting conductive substrates through packaging rubber frames 6. The regulating area 4 is filled with a liquid crystal mixture, and further provided with a spacer 5 with a thickness for supporting the infrared reflection device. The height of the spacer 5 is equal to the thickness of the regulating area 4, and both the opposite surfaces of the two light-transmitting conductive substrates are provided with parallel alignment layers 7. Both the two light-transmitting conductive substrates include a light-transmitting substrate 1 and an electrode layer 2. The electrode layers 2 are arranged on the opposite surfaces of the two light-transmitting substrates. The electrode layer 2 of at least one of the light-transmitting conductive substrates includes at least two mutually independent electrode sections 3. Various electrode sections of the same light-transmitting conductive substrate, after being respectively connected in series to a switch, are jointly connected in parallel to the same electrode of a power supply assembly. In the embodiment, the electrode layer 2 of the second light-transmitting conductive substrate includes three mutually independent electrode sections 3. The electrode sections 3 are of a strip shape; the three electrode sections 3, after being respectively connected in series to the switch 11, are jointly connected in parallel to the anode of the power supply assembly 8. The electrode layer 2 of the first light-transmitting conductive substrate, after being connected in series to the switch 11, is connected with the cathode of the power supply assembly 8. The electrode sections 3 are prepared through processes such as photo-etching and etching.

Figure 2:
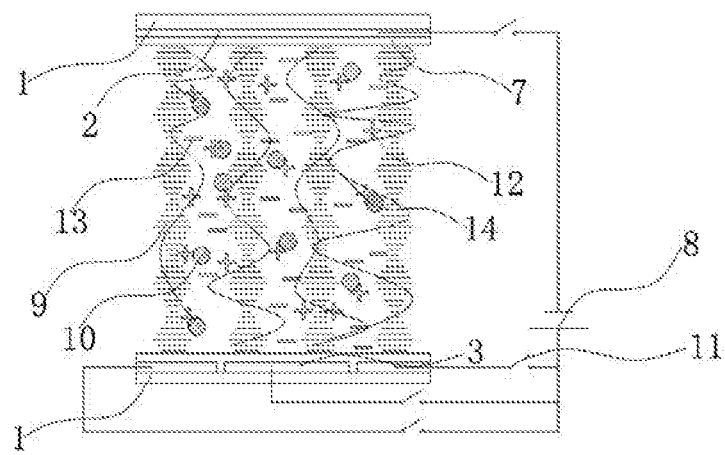

FIG. 2 is a local sectional diagram of an infrared reflection device when all switches are turned on. The liquid crystal mixture includes a negative liquid crystal 9, a chiral dopant 10, a photoinitiator and a liquid crystal monomer. The mass ratio of the negative liquid crystal 9, the chiral dopant 10, the photoinitiator and the liquid crystal monomer is 84:5:1:10. The negative liquid crystal 9 is LC2079 (from Merck KGaA, Germany), and the liquid crystal monomer is chiral monomer DB335 (from Merck KGaA, Germany), with a structural formula of

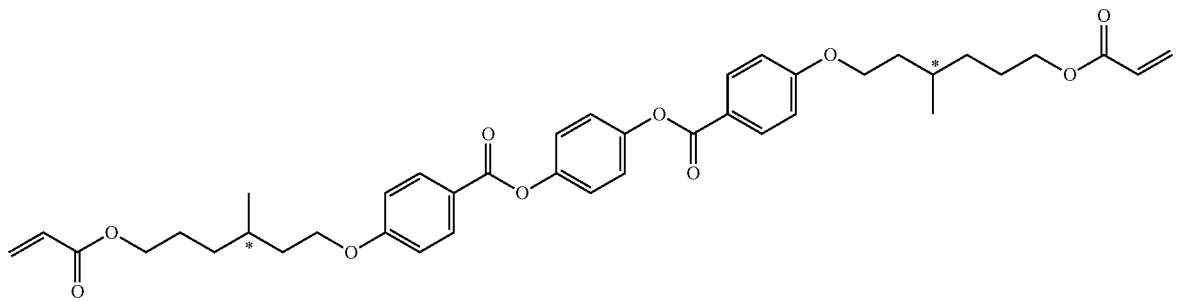 [SMILES: C=CC(=O)OCCCC(C)CCOc1ccc(C(=O)Oc2ccc(OC(=O)c3ccc(OCCC(C)CCCOC(=O)C=C)cc3)cc2)cc1]

The chiral dopant is S811 (from Bayi Space LCD Technology Co., Ltd., Beijing), with a structural formula of

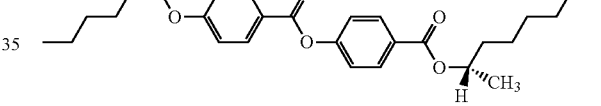

The photoinitiator is Irgacure-369 (from Heowns Biochemical Technology Co., Ltd., Tianjin), with a structural formula of

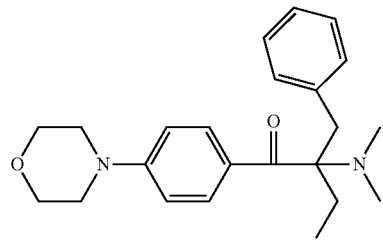 [SMILES: CCC(Cc1ccccc1)(C(=O)c1ccc(N2CCOCC2)cc1)N(C)C]

The liquid crystal monomer can form a polymer network 14 under ultraviolet irradiation. With the function of a parallel alignment layer 7, the negative liquid crystal 9 is parallel to the two light-transmitting conductive substrates. The chiral dopant 10 enables the negative liquid crystal 9 to become a spirally structured cholesteric liquid crystal, so that the cholesteric liquid crystal can reflect infrared rays. When all switches 11 are turned on, the cholesteric liquid crystal has a single pitch. The liquid crystal mixture includes impurity cations 12 and impurity anions 13. Both the liquid crystal monomer and the chiral dopant are provided with an ester group capable of capturing the cations 12, which can capture the impurity cations 12 in the liquid crystal mixture, so that the liquid crystal monomer and the chiral dopant carry positive charges.

Figure 3:
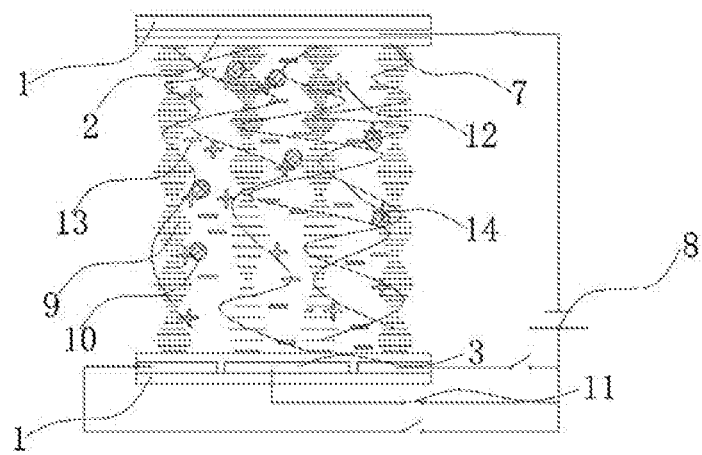
FIG. 3 is a local sectional diagram of an infrared reflection device when some of the switches are turned off.

With reference to FIG. 3, FIG. 3 is a local sectional diagram of an infrared reflection device when some of the switches are turned off. The electrode layer 2 of the second light-transmitting conductive substrate includes three mutually independent electrode sections 3. The three electrode sections 3, after being respectively connected in series to the switch 11, are connected in parallel to the anode of the power supply assembly 8. As shown, the switch 11 connected in series to the intermediate electrode section 3 is turned off, and the switch 11 connected in series to the electrode layer of the first light-transmitting conductive substrate is turned off. The cations 11 located in the middle corresponding to the electrode section 3 move toward the first light-transmitting conductive substrate under the action of the electric field, driving the polymer network 14 to move toward the first light-transmitting conductive substrate, so that the pitch of cholesteric liquid crystal in this part is changed, the pitch of the cholesteric liquid crystal close to the second light-transmitting conductive substrate becomes larger, while the pitch of the cholesteric liquid crystal close to the first light-transmitting conductive substrate becomes smaller. According to the following formula $\lambda = P \times n$, where P refers that a director of a chiral nematic phase liquid crystal rotating a space of $2\pi$ in the direction of a screw axis, namely a pitch, $\lambda$ refers to a reflection wavelength of the cholesteric liquid crystal, and n refers to an average reflective index of a liquid crystal; $\Delta\lambda = (n_e - n_o) \times P = \Delta n \times P$, where $\Delta\lambda$ refers to a reflective spectral bandwidth, and $\Delta n$ refers to a birefractive index. When the value of P is changed from a single value into a scope, the wavelength and bandwidth reflected by the liquid crystal mixture will be enlarged. Therefore, the bandwidth reflected by the liquid crystal mixture located in the middle position corresponding to the electrode section 3 is enlarged, while the reflective wavelength located at the two sides corresponding to the electrode section 3 remains the same.

Thus, the infrared refection device with an adjustable reflection proportion in the present disclosure, through controlling the switches connected in series to the electrode sections, can be used for controlling the proportion of the device part reflecting infrared rays to the whole device, thereby reaching the purpose of adjusting the reflection proportion.

Embodiment 2

This embodiment is substantially the same as the embodiment 1, but differs in that: both the electrode layers of the two light-transmitting conductive substrates include multiple mutually independent electrode sections; the electrode sections are of strip shapes stretching along the length direction of the light-transmitting conductive substrates; the electrode sections of the same light-transmitting conductive substrate, after being connected in series to the switch, are jointly connected in parallel to the same pole of the power supply assembly; and the electrode sections of the two light-transmitting conductive substrates are respectively connected with two poles of the power supply assembly.

The invention claimed is:

1. An infrared reflection device, comprising
a power supply assembly,
a plurality of switches, and
two relatively disposed light-transmitting conductive substrates packaging a continuous regulating area, each of the light-transmitting conductive substrates comprise a light-transmitting substrate and an electrode layer, wherein:
the continuous regulating area is filled with a liquid crystal mixture that has a fluidity of a liquid, wherein the liquid crystal mixture comprises a negative liquid crystal, a chiral dopant, a photoinitiator and a liquid crystal monomer capable to form a polymer network under ultraviolet irradiation; the liquid crystal monomer and/or the chiral dopant can capture impurity cations in the liquid crystal mixture so as to carry positive charges; and the liquid crystal monomer and/or the chiral dopant is provided with an ester group capable of capturing cations;
the electrode layers are arranged on opposite surfaces of the two light-transmitting substrates;
the electrode layer of at least one of the light-transmitting conductive substrates comprises at least two mutually independent electrode areas and a non-electrode area located between the at least two mutually independent electrode areas, and a first regulating area corresponding to the electrode area is fluidly connected with a second regulating area corresponding to the non-electrode area; and
electrode areas of the same light-transmitting conductive substrate, after being respectively connected in series to the switches, are jointly connected in parallel to the same electrode of the power supply assembly;
wherein, in a position corresponding to an electrode area controlled by a switch in a non-working state, the negative liquid crystal is a cholesteric liquid crystal with a single pitch, the polymer network can capture impurity cations in the liquid crystal mixture; and in a position corresponding to an electrode area controlled by a switch in a working state, the cations move toward the light-transmitting conductive substrate connected with a cathode of the power supply assembly under the action of an electric field, driving the polymer network to move to the light-transmitting conductive substrate connected with the cathode of the power supply assembly, such that the pitch of the cholesteric liquid crystal changes, and the corresponding liquid crystal mixture reflected by the bandwidth from a single value to a range of value.

2. The infrared reflection device according to claim 1, wherein the electrode layers of the two light-transmitting conductive substrates both comprise at least two mutually independent electrode area.

3. The infrared reflection device according to claim 1, wherein the electrode areas are of a strip shape.

4. The infrared reflection device according to claim 1, wherein the opposite surfaces of the two light-transmitting conductive substrates are further provided with parallel alignment layers.

5. The infrared reflection device according to claim 1, wherein the liquid crystal monomer is a chiral monomer.

6. The infrared reflection device according to any one of claim 2, wherein the opposite surfaces of the two light-transmitting conductive substrates are further provided with parallel alignment layers.

7. The infrared reflection device according to any one of claim 3, wherein the opposite surfaces of the two light-transmitting conductive substrates are further provided with parallel alignment layers.

8. The infrared reflection device according to claim 6, wherein the liquid crystal monomer is a chiral monomer.

9. The infrared reflection device according to claim 7, wherein the liquid crystal monomer is a chiral monomer.

10. The infrared reflection device according to claim 1, wherein a mass ratio of the negative liquid crystal, the chiral dopant, the photoinitiator and the liquid crystal monomer is 84:5:1:10.

* * * * *